Nov. 10, 1953  D. B. TURNER  2,658,387
SEDIMENT TESTING APPARATUS
Filed June 22, 1951  2 Sheets-Sheet 1
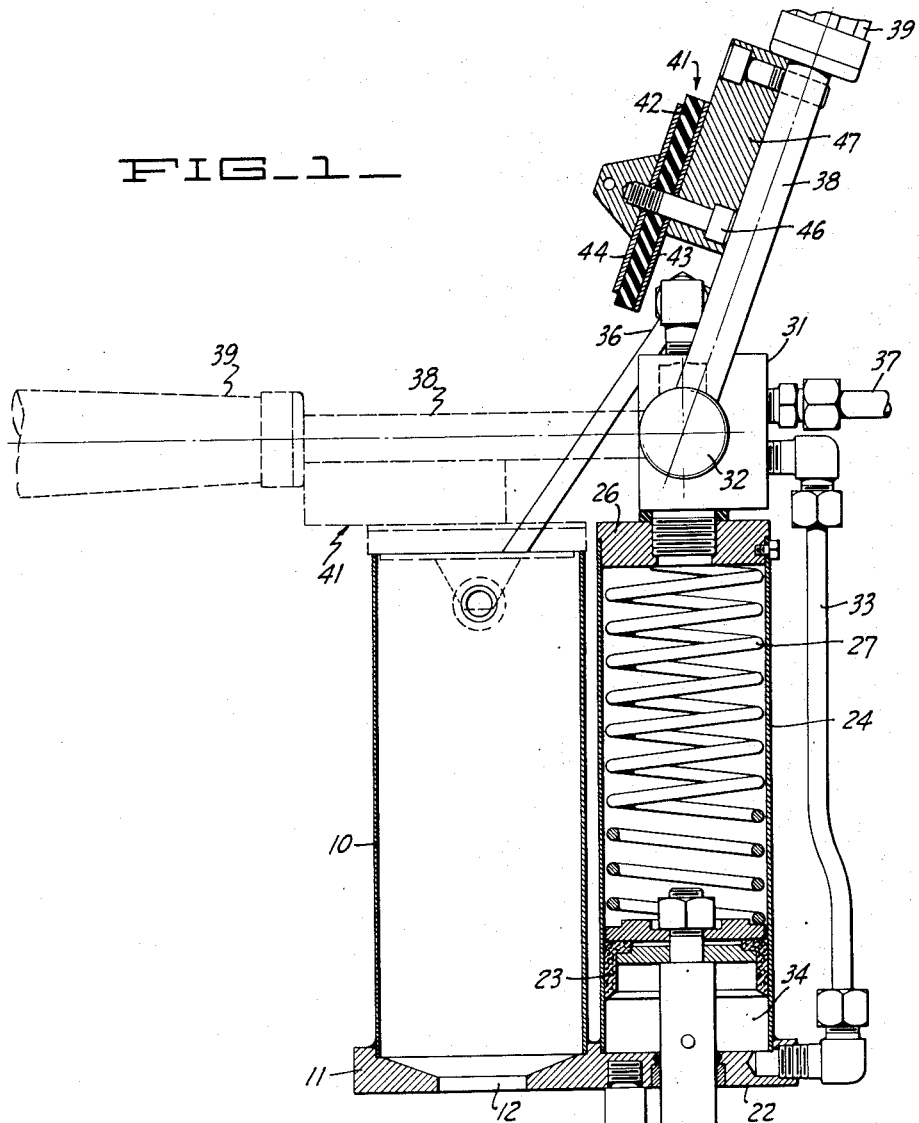
FIG_1_
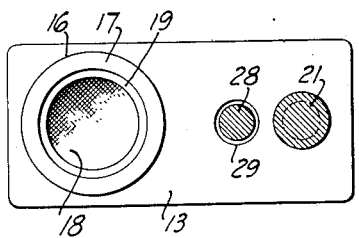
FIG_6_
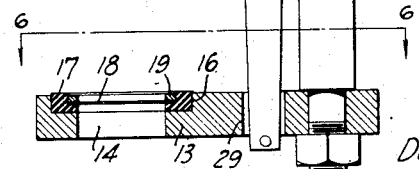
INVENTOR.
Donald B. Turner
BY
ATTORNEYS Nov. 10, 1953         D. B. TURNER         2,658,387
                SEDIMENT TESTING APPARATUS
Filed June 22, 1951                    2 Sheets-Sheet 2
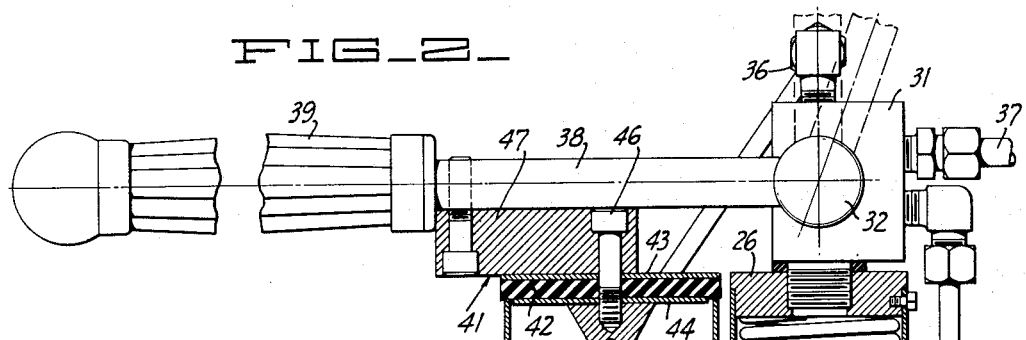
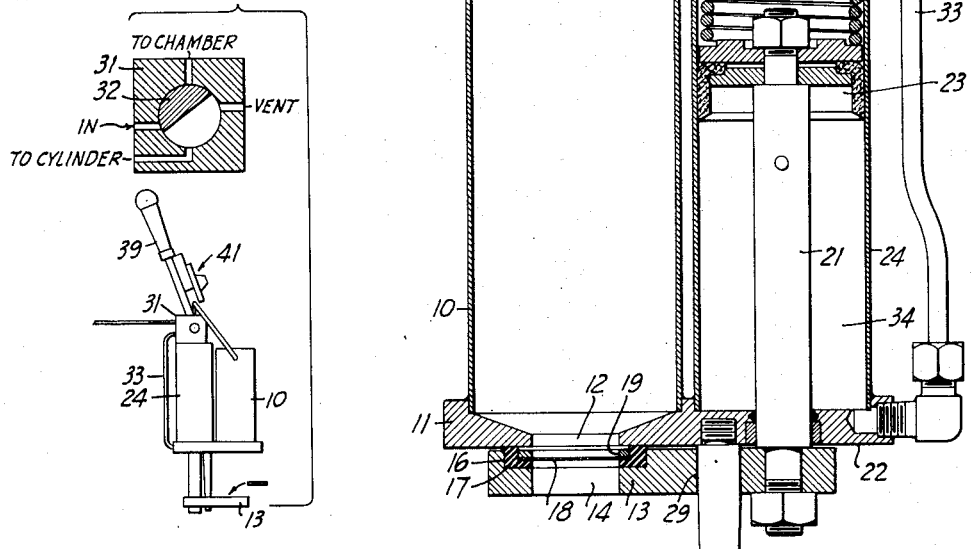
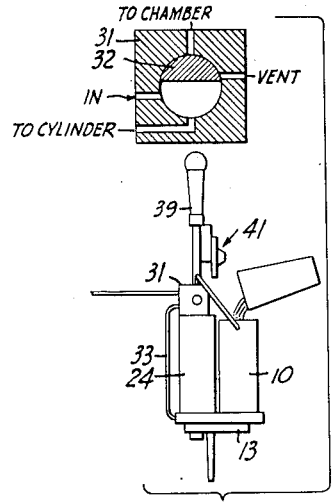
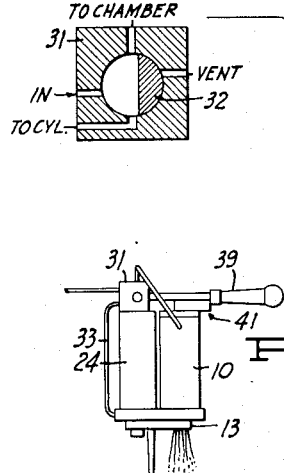
INVENTOR.
Donald B. Turner
BY
ATTORNEYS Patented Nov. 10, 1953

2,658,387

UNITED STATES PATENT OFFICE 2,658,387

SEDIMENT TESTING APPARATUS

Donald B. Turner, Petaluma, Calif., assignor to Western Condensing Company, San Francisco, Calif., a corporation of California Application June 22, 1951, Serial No. 232,955

4 Claims. (Cl. 73—61)

This invention relates generally to apparatus for making sediment testing operations.

In many laboratory and industrial test operations it is customary to pass a measured quantity of material through a filter member to determine the amount of sediment solids thus removed by filtration. Where a large number of such tests must be made conventional equipment for this purpose is troublesome and time-consuming. A large number of manual operations are involved and considerable time is required for flow of each sample through the filter member.

It is an object of the present invention to provide apparatus of the above character which will greatly facilitate making such sediment tests, and which will make possible a great saving in time where it is necessary to make a large number of such tests.

Another object of the invention is to provide apparatus of the above character which is semi-automatic in its operation, and which will function to automatically apply pressure to the sample during a filter cycle.

Another object of the invention is to provide apparatus of the above character which will facilitate application of a filter member to a sample container.

Additional objects and features of the invention will appear from the following description in which the preferred embodiment has been set forth in detail in conjunction with the accompanying drawing.

Referring to the drawing:

Figure 1 is a side elevational view, in section, illustrating apparatus incorporating the present invention.

Figure 2 is a view like Figure 1 but showing the parts in a different operating position.

Figures 3, 4 and 5 are schematic views serving to illustrate a complete cycle of operation.

Figure 6 is a cross-sectional view taken along the line 6—6 of Figure 1.

Referring to Figures 1 and 2 of the drawing, the apparatus consists of a container 10, which can be conveniently formed of a cylindrical shaped tube. The lower end of the tube is secured to a plate 11, which is provided with the downwardly directed opening 12.

Arranged below the plate 11 there is a platen 13, which has an opening 14 adapted to align itself with the opening 12. The platen is constructed to facilitate application of a filter member to the same. Thus its upper face is provided with an annular recess 16 in which the annulus 17 is seated. This annulus is formed of suitable material such as resilient rubber, and serves to mount the metal screen 18, and its associated retaining ring 19.

The platen 13 is associated with means which serves to move between the two operating positions illustrated in Figures 1 and 2. In Figure 1 the platen is in a lowered out-of-the-way position, at which time a filter member can be applied to the screen 18, or a filter member removed after an operating cycle. In its raised position shown in Figure 2, the resilient ring 17 is in sealing contact with the lower face of the plate 11, and a sample being discharged from the container 10 passes downwardly through the filter member.

The means which serves to carry and operate the platen 13 consists in this instance of a vertically extending rod 21 that is slidably fitted within the extension 22 of the plate 11, and has its upper end attached to the piston 23. The piston is fitted in the cylinder tube 24, which has its lower end suitably attached to the plate extension 22. The upper end of the tube 24 is provided with a closure 26, and a compression spring 27 acts between the closure and the piston to urge the piston downwardly. In order to prevent rotation of the rod 21 and the platen 13, suitable guide means is provided consisting of a rod 28 that has its upper end carried by the plate extension 22, and its lower end slidably fitted in an opening 29 provided in the platen.

The closure 26 serves as a convenient mounting for the pneumatic control valve 31. This valve has a rotatable operating member 32 that can be turned to any one of three operating positions, as will be presently explained. One port of the valve is connected by the tube 33 to the space 34 below the piston 23. Another tube 36 connects another port of the valve to the upper portion of the container 10. A third tube 37 connects with a source of pneumatic pressure. In addition to these tube connections, the valve body has a vent port (not shown) to the atmosphere.

An operating lever 38 is attached to the valve member 32, and carries a convenient hand grip 39. The lever 38 also serves to carry an assembly 41 for closing the upper end of the container 10. The assembly 41 can consist of a disc 42 formed of suitable resilient material, such as synthetic rubber, and which is clamped between the upper and lower metal discs 43 and 44. These parts are held together by the clamping screw 46, which in turn is carried by a block 47 attached to the lever 38.

The lever 38 has three operating positions which are indicated in the various solid and dotted line showings of Figures 1 and 2. When the lever is swung rearwardly to slightly beyond vertical position, no air is supplied from the pressure source to either the container 10 or to the space 34 below the piston 23. The platen 13 is therefore in its lowermost position, and a suitable filter member may be placed upon the screen 18. This filter member may be one which is suited to the tests to be made, and it can be proportioned to fit snugly within the retaining ring 19. Assuming now that one wishes to proceed with an operating cycle, the lever is swung to its vertical position, and this serves to apply pneumatic pressure from the source to the space 34 below the piston, to thereby raise the piston and the platen whereby the platen is brought into sealing contact with the plate 11. The operator now pours the sample into the container 10, and then swings the lever 38 forwardly and downwardly to bring the assembly 41 into sealing relation with the top of the container 10. Such final movement of the lever 38 positions the control valve whereby pneumatic pressure is applied to the upper part of the container 10, in addition to the pressure maintained below the piston 23. Pressure applied to the container 10 serves to accelerate flow of the sample through the filter member. When the sample has been expelled, the handle 38 is swung back to its initial position, whereby the space 34 below the piston 23 is vented to the atmosphere through the control valve, with the result that the piston together with the platen moves downwardly under the urge of spring 27. The operator may now remove the filter member for sediment inspection or analysis, after which he can proceed with another test cycle.

Figures 3, 4 and 5 facilitate an understanding of a complete test cycle. Figure 3 illustrates the initial position of the lever 38, with the platen 13 in lowered position, and with the closure assembly 41 in an out-of-the-way position. By reference to the diagrammatic control valve illustrated in this figure, it will be apparent that at this time the space 34 below the piston 23, is vented to the atmosphere, and the line from the source of air pressure is closed. Figure 4 illustrates a second operating position in which the lever 38 is vertical. Note the changed position of the control valve in which the source of air is now placed in communication with the tube 33 and the space 34 below the piston. Figure 5 illustrates the third operating position in which the lever 38 is in horizontal position, and in which the sample is being expelled. Note that the control valve now connects the source of air with the sample container, and that at this time the line 33 and the space 34 below the piston are also connected with the source of air pressure.

It will be apparent that my apparatus is capable of carrying out a large number of routine sediment testing operations in a minimum amount of time. The operation of the device is semi-automatic, and therefore aside from the saving in time, there is less opportunity for the human factor to introduce errors.

While in the foregoing description particular reference has been made to making sediment tests, it will be evident that the apparatus can be used for a variety of test operations, where measured samples of a fluid material are to be passed through a filter membrane to determine the amount or character of filterable solids present.

I claim:

1. In a sediment testing apparatus, a chamber adapted to contain a sample of material having sediment solids, said chamber having a lower opening for discharge of the sample, means including a platen movable between clamping and released positions with respect to said chamber for removably applying a filter member across said opening, spring means for urging said platen toward released position of the same, pneumatic motive means for urging the platen toward clamped position of the same, a control valve adapted to be connected to a source of air under pressure, and connections from said control valve to said pneumatic motive means and to said chamber, said control valve in one operating position of the same serving to apply pneumatic pressure to said pneumatic motive means and to said sample chamber to discharge a sample from the same, said control valve in another operating position of the same serving to vent pressure from said pneumatic motive means to permit movement of said platen to released position of the same.

2. In a sediment testing apparatus, a chamber adapted to contain a sample of material having sediment solids, said chamber having a lower opening for discharge of the sample, a platen movable between a raised position in engagement with the lower end of the chamber and to a lowered position in spaced relationship with said chamber, said platen being adapted to carry a filter member whereby when the platen is in its raised position, the filter member is applied across said opening, a pneumatic cylinder, a piston slidably disposed in said cylinder, means connecting the piston to the platen to move the platen between said raised and lowered positions of the same, spring means serving to urge the platen toward said lowered position, a pneumatic control valve, a handle operatively connected to the control valve and movable to either one of three operating positions, a closure for the upper end of the chamber attached to said handle, whereby when the handle is in one of its three operating positions, said closure serves to seal the upper end of the chamber, and piping forming pneumatic connections from said control valve to a source of air under pressure and from said control valve to said pneumatic cylinder and to the upper portion of said chamber, movement of said handle to one operating position of the same serving to position said control valve to vent air from said source to the atmosphere whereby the platen is in its lowered position, said handle in its second operating position serving to position the valve to apply pneumatic pressure from said source to said cylinder to raise the platen against the lower end of the chamber, said handle in its third operating position serving to position the valve to connect the source of air pressure to the upper part of the chamber and to continue application of air pressure to said cylinder, the closure for said chamber being disposed across the upper end of the chamber to seal the same for the third operating position of the handle.

3. In a sediment testing apparatus, a chamber adapted to contain a sample of material having sediment solids, said chamber having an opening for discharge of the sample, means including a platen movable between clamping and released positions with respect to the chamber and serving in its clamping position to apply a filter member across said opening, spring means for urging said platen toward said released position of the same, a control lever, and pneumatic means responsive to operation of said control lever for urging said platen toward clamped position of the same and to apply pressure to said chamber for discharge of a sample through said filter member.

4. In a sediment testing apparatus, a chamber adapted to contain a sample of material having sediment solids, said chamber having a lower opening for discharge of the sample, a platen movable between a raised position in engagement with the lower end of the chamber and a lowered position in spaced relationship with said chamber, said platen being adapted to carry a filter member whereby when the platen is in its raised position, the filter member is applied across said opening, means for operating said platen between the said raised and lowered positions of the same, a pneumatic control valve, a movable handle operatively connected to the control valve, a closure for the upper end of the chamber attached to said handle, whereby when the handle is in a lowered operating position, said closure serves to seal the upper end of the chamber, and piping forming pneumatic connections from said control valve to a source of air under pressure and from said control valve to the upper portion of said chamber, movement of said handle to a raised operating position serving to position said closure in an out-of-the-way position with respect to the chamber, movement of said handle to said lowered operating position serving to position said closure to close the chamber and serving to connect the source of air pressure to the upper part of the chamber to apply pressure to the sample.

DONALD B. TURNER.

References Cited in the file of this patent

UNITED STATES PATENTS

| Number | Name | Date |
|---|---|---|
| 1,599,964 | Haven | Sept. 14, 1926 |
| 2,119,501 | Baumann | May 31, 1938 |
| 2,307,318 | Kinney | Jan. 5, 1943 |